United States Patent
Laligand et al.

(10) Patent No.: US 8,522,283 B2
(45) Date of Patent: Aug. 27, 2013

(54) TELEVISION REMOTE CONTROL DATA TRANSFER

(75) Inventors: Pierre-Yves Laligand, Palo Alto, CA (US); John H. Grossman, IV, Fremont, CA (US); Alok Chandel, San Francisco, CA (US); Michael J. LeBeau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 13/111,853

(22) Filed: May 19, 2011

(65) Prior Publication Data

US 2011/0313775 A1 Dec. 22, 2011

Related U.S. Application Data

(60) Provisional application No. 61/346,870, filed on May 20, 2010.

(51) Int. Cl.
*G06F 3/00* (2006.01)
*G06F 13/00* (2006.01)
*H04N 5/445* (2011.01)

(52) U.S. Cl.
USPC ............ 725/53; 725/43; 725/51; 725/80; 725/81; 725/115; 725/133; 725/141; 725/145; 725/153; 348/734; 704/270.1; 704/275; 704/251

(58) Field of Classification Search
None
See application file for complete search history.

(56) References Cited

U.S. PATENT DOCUMENTS

| | | | |
|---|---|---|---|
| 5,267,323 A * | 11/1993 | Kimura | 381/110 |
| 6,721,953 B1 * | 4/2004 | Bates et al. | 725/39 |
| 6,747,566 B2 * | 6/2004 | Hou | 340/12.54 |
| 7,392,281 B1 | 6/2008 | Kanojia et al. | |
| 8,000,965 B2 | 8/2011 | Yamamoto et al. | |
| 2002/0071577 A1 * | 6/2002 | Lemay et al. | 381/110 |
| 2002/0087987 A1 | 7/2002 | Dudkiewicz et al. | |
| 2003/0095212 A1 * | 5/2003 | Ishihara | 348/734 |
| 2003/0167171 A1 * | 9/2003 | Calderone et al. | 704/270 |
| 2004/0193426 A1 | 9/2004 | Maddux et al. | |
| 2004/0194141 A1 * | 9/2004 | Sanders | 725/53 |
| 2005/0028208 A1 | 2/2005 | Ellis et al. | |
| 2005/0066370 A1 * | 3/2005 | Alvarado et al. | 725/80 |
| 2006/0132326 A1 | 6/2006 | Fang et al. | |
| 2007/0197164 A1 | 8/2007 | Sheynman et al. | |
| 2007/0290876 A1 | 12/2007 | Sato et al. | |
| 2008/0062337 A1 * | 3/2008 | Maier | 348/734 |
| 2008/0100747 A1 * | 5/2008 | Lin et al. | 348/553 |

(Continued)

OTHER PUBLICATIONS

Office Action for U.S. Appl. No. 13/248,912 dated Jan. 17, 2012. 37 pages.

(Continued)

*Primary Examiner* — Jason J Chung
(74) *Attorney, Agent, or Firm* — Fish & Richardson P.C.

(57) ABSTRACT

A computer-implemented method for information sharing between a portable computing device and a television system includes receiving a spoken input from a user of the portable computing device, by the portable computing device, submitting a digital recording of the spoken query from the portable computing device to a remote server system, receiving from the remote server system a textual representation of the spoken query, and automatically transmitting the textual representation from the portable computing device to the television system. The television system is programmed to submit the textual representation as a search query and to present to the user media-related results that are determined to be responsive to the spoken query.

24 Claims, 12 Drawing Sheets

(56) References Cited

U.S. PATENT DOCUMENTS

| | | |
|---|---|---|
| 2008/0103780 A1 | 5/2008 | Dacosta |
| 2008/0120112 A1 | 5/2008 | Jordan et al. |
| 2008/0167872 A1 | 7/2008 | Okimoto et al. |
| 2008/0270449 A1* | 10/2008 | Gossweiler et al. .......... 707/102 |
| 2009/0112592 A1 | 4/2009 | Candelore |
| 2009/0133048 A1* | 5/2009 | Gibbs et al. .................... 725/14 |
| 2009/0320076 A1* | 12/2009 | Chang ............................. 725/60 |
| 2010/0071007 A1 | 3/2010 | Meijer |
| 2010/0296654 A1 | 11/2010 | Wilson et al. |
| 2010/0333163 A1* | 12/2010 | Daly .............................. 725/133 |
| 2011/0067059 A1 | 3/2011 | Johnston et al. |
| 2011/0134320 A1* | 6/2011 | Daly .............................. 348/462 |

OTHER PUBLICATIONS

Office Action for U.S. Appl. No. 13/248,912 dated May 18, 2012. 46 pages.

* cited by examiner

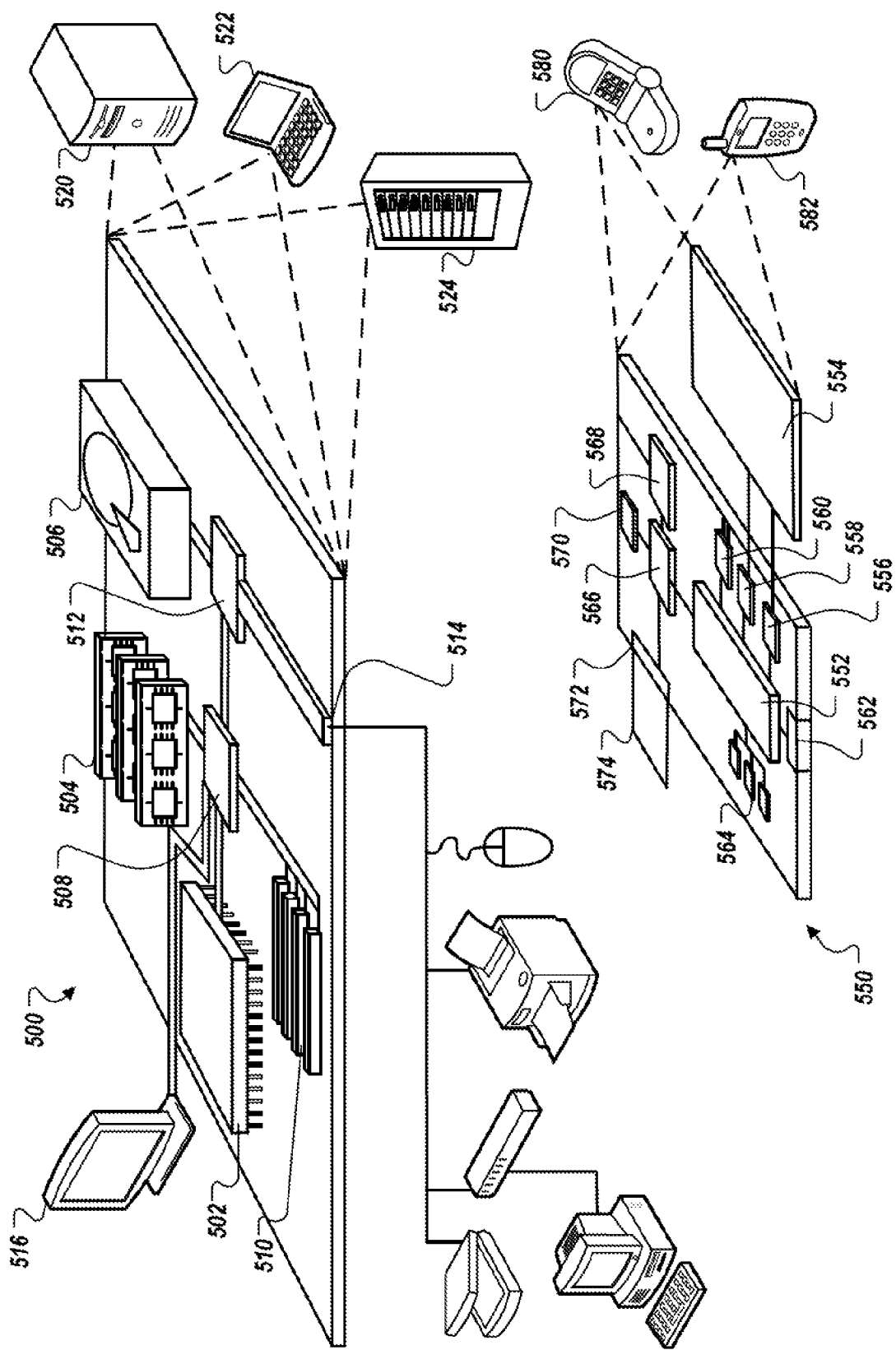

TELEVISION REMOTE CONTROL DATA TRANSFER

CROSS-REFERENCE TO RELATED APPLICATION

This application claims priority to U.S. Provisional Application Ser. No. 61/346,870, filed May 20, 2010, entitled "Computer-to-Computer Communication," the entire contents of which are hereby incorporated by reference.

TECHNICAL FIELD

This document relates to submitting data, such as a voice-based search query, on a first computer, such as a smartphone, and having results from the submitted data, such as search results, appear automatically on a second computer, such as a television monitor or a desktop computer.

BACKGROUND

People interact more and more with computers, and they also interact more and more with different kinds of computers. While desktop and laptop computers may have been the most prevalent computers in people's lives in the past, most people are more likely now to interact with smart phones, DVRs, televisions, and other consumer devices that include computers in them.

Certain computers are well-suited for entering and editing information, such as desktop and laptop computers. Other devices are better suited to delivering information but not receiving it, such as televisions that do not include keyboards, or that have keyboards of limited size. Also, some computers are best used in certain situations, and other computers in other situations. For example, a smartphone is typically best used on-the-go and at close quarters. In contrast, a television is better used while a user is stationary, and frequently from relatively long-distances.

SUMMARY

This document discusses systems and techniques by which a person may enter data using one computer, and may use associated data by employing another computer. The associated data may be generated at the other computer based on the user's submission at the first computer. The linking of the two computers may occur by the first computer submitting a request to a server system, receiving a response, and sending information directly to the second computer using the response. The second computer may then send that same or resulting information to a second server system (which may be part of, or operate in cooperation with, the first server system) and may use a response from the second server system to provide information to a user of the two computers.

In one such example, a viewer of a television program may be holding a smartphone and be using it as a remote control via an appropriate application or app installed on the smartphone. The smartphone may be programmed with APIs that accept voice input, that package audio of the voice input and send it to a speech-to-text server system via the internet, and that receive in response the text of what was spoken by the user. The smartphone app may then forward the text—which might be a media-related search, such as "movies with Danny DeVito"—to the television (which may be a television itself, a set-top box, a DVD player, or similar adjunct appliance that can be used with a television). The television may not have similar speech-to-text functionality, so that the use of the smartphone may effectively provide the television with that functionality. The television may then, according to an application running there, recognize that text coming from the smartphone app is to be treated in a particular manner. For example, the television may submit the text to a remote search engine that searches on media-related terms and returns media-related results. For example, the search engine may search programming information for an upcoming period and also media-related databases that reflect movies, songs, and programs, the artists that appeared with each, and summaries of such items, much like many well-known movie and TV-related web sites provide to users who visit those sites.

The display may be delayed, such as if the second computer is not currently logged onto the system, and so that the results may be delivered when the user subsequently tunes in or logs on. The results for such a delayed delivery may be generated at the time the request is submitted (and may be stored) or at the time the user later gets them at the second computer (so that the request is stored and is then executed when delivery of the results is to occur). For example, the user may speak the query "sports tonight" into a smartphone while driving in his car, but not be able to interact with it at the present time (because he is busy and/or because the results are not the type of thing that can be interacted with effectively on a smartphone). The results in such a situation could, therefore, be sent automatically for display on the user's television, either on the backside through a server system or by being held on the smartphone until the smartphone identifies itself as being in the vicinity of the user's home WiFi router, and then by the smartphone checking to see if the television is on to be communicated with, and communicating the text of the query when such conditions occur. The user may then immediately be presented with such results on his television when he walks into the house and may quickly select one of them. The provision of the query to the television may occur when the user is within a set distance of his home also (e.g., by determining with GPS functionality on the smartphone that he is within ¼ mile of the home), and the television may be turned on automatically as he approaches the home, with the television tuned to a channel that is determined to be most relevant to the query (e.g., to a sport that is on the highest-rated channel and a type of sport that the user has identified on a profile as being his favorite type of sport), with the user's ability to quickly change to another sporting event that is currently being displayed.

The data flow to and from the smartphone and television may occur in a variety of manners. For example, as discussed above, the smartphone may initially communicate with a remote server system, receive results back from the remote server system, and forward the results or generate information that is derivative of the results, and send it directly to the television. The television may then send data to another computer server system, and receive results back from it, such as media-related results that can be displayed automatically in a list of results and as part of a program guide grid in a familiar manner. The communications with the servers may be over the internet while the communications between the smartphone and the television may be over only a local area network such as a WiFi or similar network. In another example, the smartphone may send a file of the spoken query to a remote server system and may receive the ultimate results, which it may then pass to the television for display, without the television having to communicate with a server system. For example, the smartphone may have a speech-to-text app that sends the speech up to a server, receives text back from the server and sends it to a television remote control app running on the smartphone, and that app may then submit the text to a media-specific search engine, which may then return data for making a list and grid of programs, and the smartphone may forward that data to the television where it may be displayed.

In certain examples, the smartphone may display results that are good for small-screen display, and the television may display results that are useful for large-screen display. For example, the smartphone may display a vertical list of programs that are responsive to a query (e.g., all soon-upcoming episodes of Seinfeld if the user spoke "When is Seinfeld?"), while the television may show the same results but in the context of a two-dimensional program guide grid. The user may step through the results in the list on the smartphone, and the grid may automatically jump, in a synchronized manner, to the corresponding episode on the grid on the television. If the user selects one of the episodes on the list, the television may immediately tune to the episode if it is currently being shown, or may jump to it later when it starts and/or set it for recording on a personal video recorder (PVR).

The techniques discussed here may, in certain implementations, provide one or more advantages. For example, a user of multiple computing devices—such as a smartphone and a television—may be allowed to submit information using a computing device that is best-suited to such submission, such as a smartphone that performs speech-to-text conversion (perhaps via a server system to which it sends audio files). The user may then review results from the information, on a different computing device that is better-suited for such review, such as a television. Such techniques may allow the user to easily extend the functionality of computers that they already own. For example, software to enable such data submission and routing may be easily added to a smartphone, or a user may simply use a browser on the smartphone to log into an account on a hosted service that may then pass the information to a browser on another device, or the provider of the account may recognize that certain search results should be provided to a target computer that has previously been registered with, or logged into, the account. Also, the user may employ an app for speech-to-text conversion on the smartphone to enable voice inputs to a television that does not itself support speech-to-text conversion. In these various ways, the two or more computing devices may interact directly or through server systems so that each of the computing devices can provide its best features, and the two devices together can provide functionality that is even better than the separate additive functionalities of the devices.

In one implementations, a computer-implemented method for information sharing between a portable computing device and a television system is disclosed. The method comprises receiving a spoken input from a user of the portable computing device, by the portable computing device, submitting a digital recording of the spoken query from the portable computing device to a remote server system, receiving from the remote server system a textual representation of the spoken query, and automatically transmitting the textual representation from the portable computing device to the television system. The television system can be programmed to submit the textual representation as a search query and to present to the user media-related results that are determined to be responsive to the spoken query. The method can also comprise, before automatically transmitting the textual representation, pairing the mobile computing device and television system over a local area network using a pairing protocol by which the mobile computing device and television system communicate with each other in a predetermined manner. The method can also comprise using the textual representation to perform a local search of files stored on recordable media located in the television system. In addition, the method can include automatically submitting the textual representation from the television system to a remote search engine, receiving in return search results that are responsive to a query in the textual representation, and presenting by the television system the search results.

In some aspects, the search results are presented as a group of music, movie, or television items that are determined to be responsive to the query, and are presented on the television system so that the user may select one or more of the items for viewing or listening. Also, the method can include transmitting all or a portion of the search results from the television system to the mobile computing device. The method can further comprise providing to the search engine a request type for the search request that defines a type of information to be provided in the search results, and receiving search results that the search engine directed to the request type. As another aspect, the method can also include determining on the mobile computing device whether the spoken input is directed to the television system, and automatically transmitting the textual representation from the portable computing device to the television system only if the spoken input is determined to be directed to the television system.

In other aspects, the method can include determining that the television system is not currently available to display the results, and storing the results or the textual representation until the television system is determined to be available to display the results. The method can further comprise receiving from the television system an indication that a user has selected a portion of the search results, and automatically causing a display on the portable computing device to change in response to receiving the indication, and receiving a subsequent user input on the portable computing device, and causing the presentation of the search results to change in response to receiving the subsequent user input.

In another implementation, a computer-implemented method for information sharing between computers is disclosed. The method comprises receiving a spoken input at a first computer from a user of the first computer; providing the audio of the spoken request to a first remote server system; receiving a response from the first remote server system, the response including text of the spoken request; and automatically transmitting data generated from the response that includes the spoken request, from the first computer to a second computer that is nearby the first computer, wherein the second computer is programmed to automatically perform an action that causes a result generated by applying an operation to the transmitted data, to be presented to the user of the first computer. The method can also comprise automatically submitting the text of the spoken request from the second computer to a remote search engine, receiving in return search results that are responsive to a query in the text of the spoken request, and presenting by the second computer the search results. The search results can be presented on the second computer as a group of music, movie, or television items that are determined to be responsive to the query, and are presented on the second computer so that the user may select one or more of the items for viewing or listening. Also, the method can include transmitting all or a portion of the search results from the second computer to the first computer.

In yet another implementation, a computer-implemented system for information sharing is described. The system comprises a mobile computing device, and software stored on the mobile computing device. The software is operable on one or more processors of the mobile computing device to transmit spoken commands made by a user of the mobile computing device, to a remote server system; receive in response, from the remote server system, text of the spoken commands; and automatically provide the text received from the remote server system to a second computer operating in the close vicinity of the mobile computing device. The system may also include the second computer, wherein the second computer is programmed to provide the text received from the remote server system to a second remote server system as a search query, and to use search results received in response from the second remote server system to present the search results on a display of the second computer. The second computer can comprises a television, and the first computer and the second computer can be programmed to automatically pair over a local data connection when each is within communication of the local data connection. Also, the second computer can be programmed to submit the text to a search engine that performs searches directed specifically to media-related content.

The details of one or more embodiments are set forth in the accompanying drawings and the description below. Other features and advantages will be apparent from the description and drawings, and from the claims.

DESCRIPTION OF DRAWINGS

FIG. 5 is a block diagram of computing devices that may be used to implement the systems and methods described in this document, as either a client or as a server or plurality of servers.

DETAILED DESCRIPTION

This document describes systems and related techniques for passing information from a first computer to a server system, creating information that is responsive to the passed information using the server system, and then automatically returning responsive information from the server system to the first computer and on to a second computer that is different than the first computer. The second computer may then uses the information it receives to send a request to a second server system, may obtain a response, and may provide output to a user of the two computers.

In one example, a search query is spoken by a user into a first computer, such as a smartphone, and is submitted to a search engine that is remote from the smartphone, such as over the internet. A textual representation of the spoken query is then returned to the first computer, which in turn automatically forwards the textual representation to a second computer (perhaps after reformatting or otherwise modifying the textual representation). Upon receiving the textual representation, the second computer automatically processes it, typically by submitting it to a local search engine on the second computer (e.g., to determine whether media programming information on the second computer, such as recorded television programs and electronic program guide (EPG) information, matches the query) and to a server-based public search engine which may be directed particularly to media-based results (i.e., those relating to various types of electronic entertainment, education, and similar content). Those results may then be displayed by the second computer (e.g., as being displayed on a display connected to the second computer, such as a television that houses the second computer or that is connected to a set-top box that houses the second computer).

The user may then interact with the results using the first computer, and such interaction can be reflected on a display of the first and/or second computer. For example, a user can browse a basic representation of search results on a smartphone, and a more detailed representation of the results on a television. User input may occur via a touchscreen on the smartphone, physical buttons on the smartphone, or sensed motion of the smartphone.

Figure 1A:
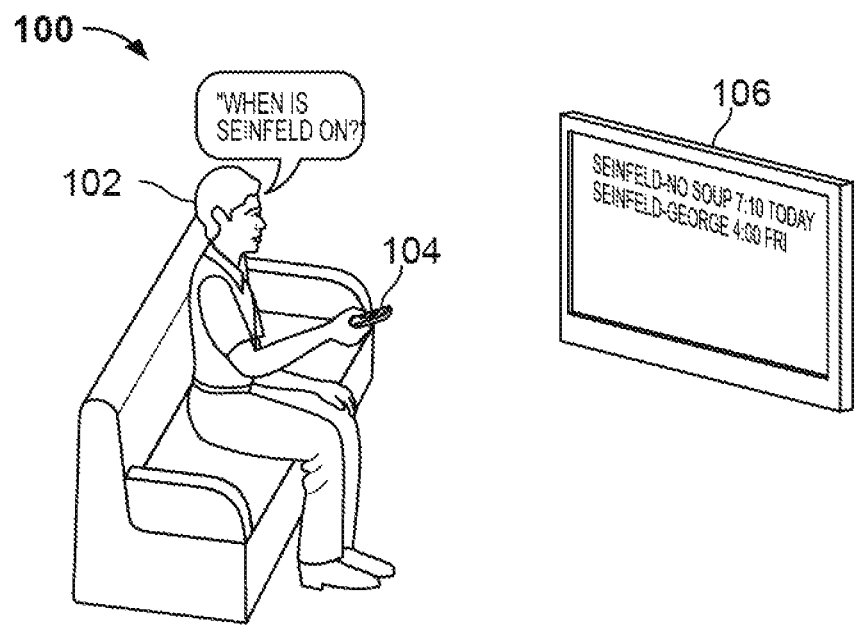
FIG. 1A shows an example by which data may be submitted at a first computer and reviewed and handled at a second computer.

FIG. 1A shows an examples by which data may be submitted by a first computer and reviewed and handled at a second computer. In FIG. 1A, a system 100 is shown, in which a user 102 of a smartphone 104 is shown sitting on a couch watching a television 106. For example, the user 102 may be sitting down for an evening of watching primetime television but may not know immediately what he wants to watch. Alternatively, the user may be watching a show that he does not like and may be interested in finding a better show. The user may also be interested in something other than television. For example, the user may be watching the news, may hear reference to a certain geographic area, and may want to perform some quick research to follow up on what he has heard. Other similar interests of the user may be addressed by the system 100.

In this example, the user is shown speaking into the smartphone 104, and asking the query "when is Seinfeld on?" This query, of course, indicates that the user would like to find out when the next episode or episodes of the television situation comedy Seinfeld is being shown by his television provider. The smartphone 104 may be equipped with voice search capabilities, by which certain requests spoken into the smartphone 104 are provided as sound files to a remote server system that may convert the sound files to text and then create search results that are responsive to the request. In certain implementations, the smartphone 104 may execute an application or app that packages the sound, sends it to a server system for conversion to text, and then receives back the converted text and forwards it to one or multiple computers, such as television 106, with which the smartphone 104 has paired up for communication (e.g., over a LAN such as a WiFi network).

The television 106 may be a modern television that is provided with a certain level of computing capabilities, and may include WiFi or other data networking technologies built into the television 106, or provided as an adjunct to the television 106, such as in a cable or satellite box. References here to a television or television system are intended to cover both integrated and separate approaches. The smartphone 104 and television 106 may have been previously registered with a speech-to-text service and a search server system, respectively, and correlated to an account for user 102 (e.g., by the user logging into an account for the user, with the devices). In this manner, the relevant server systems and services may readily determine that the two devices are related to or registered to the user 102, and may perform actions like those discussed here using such knowledge.

When the user 102 speaks a voice command and a sound file is sent to a server system, search results may be sent back to the system 100. In certain implementations, and in a traditional manner, the search results may be displayed on the smart phone 104. However, the smartphone 104 may not be large enough to display a complete electronic program guide grid in the form in which the "Seinfeld" search results may be provided by the system. Also, the smartphone 104 may not be equipped to take appropriate actions using the search results, such as switching automatically to a channel on which an episode of Seinfeld is being played, or programming a personal video recorder to record the current or future episode of Seinfeld that appears in the search results. As a result, in this example, the search results have been provided instead (or in addition) to the television 106, and the user may then further interact with the system 100 to carry out their own particular wishes. As one example, the user may interact further with the smartphone 104, such as by using a remote control application for the smartphone 104, so as to cause channels on the television 106 (including with a cable or set top box), to be changed to the appropriate channel automatically.

The results may get to the television 106 by various mechanisms. For example, a central server system may identify all devices that are currently logged in or registered for the user, and may then determine which devices may be able to display the relevant results. Where multiple active devices are capable of handling the results, the system may determine which device is most likely to be the target of the user's input. Such a determination may be made, for example, by identifying the active device that is geographically closest to the device that submitted the query, or the device that best matches a type of the results. For example, if the results are determined to be media-related (e.g., they are links to TV episodes and streaming movies), then a television can be preferred over other devices for receiving the results. In another example, the smartphone 104 may submit a sound file to one server system and receive equivalent text in return, and may then forward the text to the television 106. The television 106 may in turn be programmed to send the text to a search engine service that is programmed especially to provide media-related results (e.g., music, movies, and television programs), and to then display the search results, such as by showing a program guide grid around upcoming episodes of Seinfeld. The television 106 may alternatively, or additionally, search its own local storage in a similar manner.

Figure 1B:
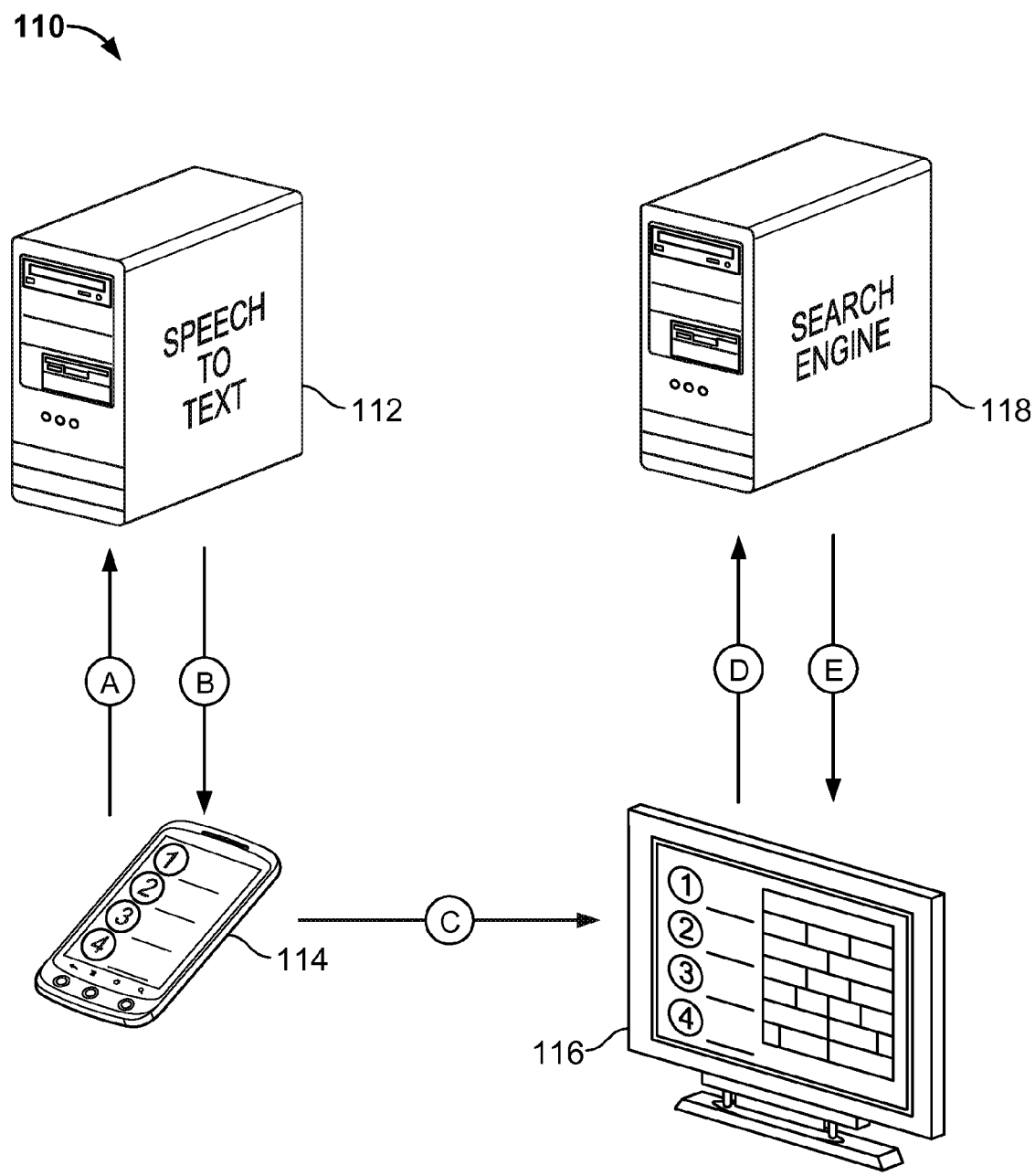
FIG. 1B is a schematic diagram showing communication between user computers and server systems.

FIG. 1B is a schematic diagram showing communication between user computers and server systems. The system 10 shown in the figure may correspond to the scenario just discussed with respect to FIG. 1A. In particular, a smartphone 114 may communicate over the internet with a speech-to-text server system 112, and in turn with a television 116 that is proximate (essentially in the same room as) the smartphone 114. The television then in turn communicates with a search engine 118 server system. Such communications may be triggered by a user speaking into a microphone on the smartphone 114, and then all subsequent actions are taken automatically by the system 110, without further intervention by the user (until the user may interact with results displayed, in the end, on the television 106).

The smartphone 114 may take a familiar form, and may be generally a touchscreen device onto which a variety of applications or apps may be loaded and executed. One such application may be included with the operating system or loaded later, and may provide an application programming interface (API) that receives spoken input, converts it to text, and then provides the text to whatever application is currently the focus of the device.

While the smartphone 114 may perform its own speech-to-text conversion, such conversion may also occur with the assistance of the speech-to-text server system 112. As shown by flow arrow A, an audio file of various forms may be passed up from the smartphone 114 to the server system 112, where it may be analyzed and converted into corresponding text, which may be encoded, encrypted, or transmitted as plaintext back to the smartphone 114, as indicated by flow Arrow B. Upon performing its own conversion or receiving the text from server system 112, the smartphone 114 can automatically forward the text to the television 116. In this manner, the smartphone 114 may serve as a voice input front end for the television 116, which may not have a microphone or a mechanism by which to position a microphone directly in front of the user (e.g., for cost purposes, the remote control shipped with the television 116 may only communicate via traditional RF or IR mechanisms).

The passing of information from the smartphone 114 to the television 116 is shown in the figure by Arrow C. The television 116 may then process the information, either internally to the television or externally by passing the information, or a derivation of the information, to the search engine 118 server system, or another form of server system. For example, the textual version of the spoken input form the user may be passed up to the search engine 118 along with other appropriate information, such as a flag that indicates the television 116 is seeking media-related results, as opposed to general web results, images, shopping results, or other such common sub-categories of results. The television may also perform other transformations or formatting changes to the data or information.

Arrow D shows the communication and request passing up from the television 116 to the search engine 118. The search engine 118 may be a public search engine that can be accessed manually by users, and has also published an API by which automated systems may submit queries and receive search results in a predetermined and defined format. Arrow E shows the results being passed down from the search engine 118 to the television 116. As shown on the screen of the television 116, the results may be particular episodes of a program like Seinfeld, and the display may show the various episodes in a numbered list of search results on the left side, and a grid surrounding whatever episode is currently selected in the list.

Although not shown by an arrow, certain of the search result information may be communicated form the television 116 to the smartphone 114. For example, the information for generating the list of results may be transmitted, and as shown in the figure, the smartphone 114 is displaying the same search result list, but is not also displaying the program guide grid because it is a small device for which there is no room for such an extensive display of content. The user may then select particular episodes by tapping on the corresponding episode on the display, which may cause the program guide grid to scroll so that it again surrounds the newly selected episode. Other controls may be shown on the smartphone, such as buttons to let a user choose to tune to a selected program immediately, or to set a PVR to record the episode in the future. In addition, other relevant remote control functionality may be provided with an application executing on the smartphone 114, such as buttons for changing channels, colors, volume, and the like.

In this manner then, the system 110 may, in certain implementations, provide for synergies by using speech input and conversion capabilities that are available on a user's telephone, tablet, or other portable computing device, in order to control interactivity with a television. In other examples, the voice input by a user may be directed to a chat session being displayed on the television 116. A user may speak into the smartphone 114, have the speech transcribed, and then have the transcribed text posted to the chat session, either fully automatically or after the user confirms that the text returned form the server system 112 is accurate (or if the user does not respond during a pre-set delay period). The conversion may also be accompanied by a language translation, e.g., from a language of the user into a language of the other person on the chat session. For example, an audio file may be sent to the server system 112 in English (Arrow A in the figure), and text may be returned in French (Arrow B) and then supplied to a chat application. The French user may employ similar functionality, or text may arrive at the television 116 in French and can be passed from the television 116 to the smartphone and then to a server system for translation, or passed directly from the television 116 to the server system for translation. Other such applications may likewise employ speech-to-text conversion and language translation using one device (e.g., smartphone 114) that then causes the converted and/or translated text or audio to be passed to another computing device (e.g., television 116).

Figure 2A:
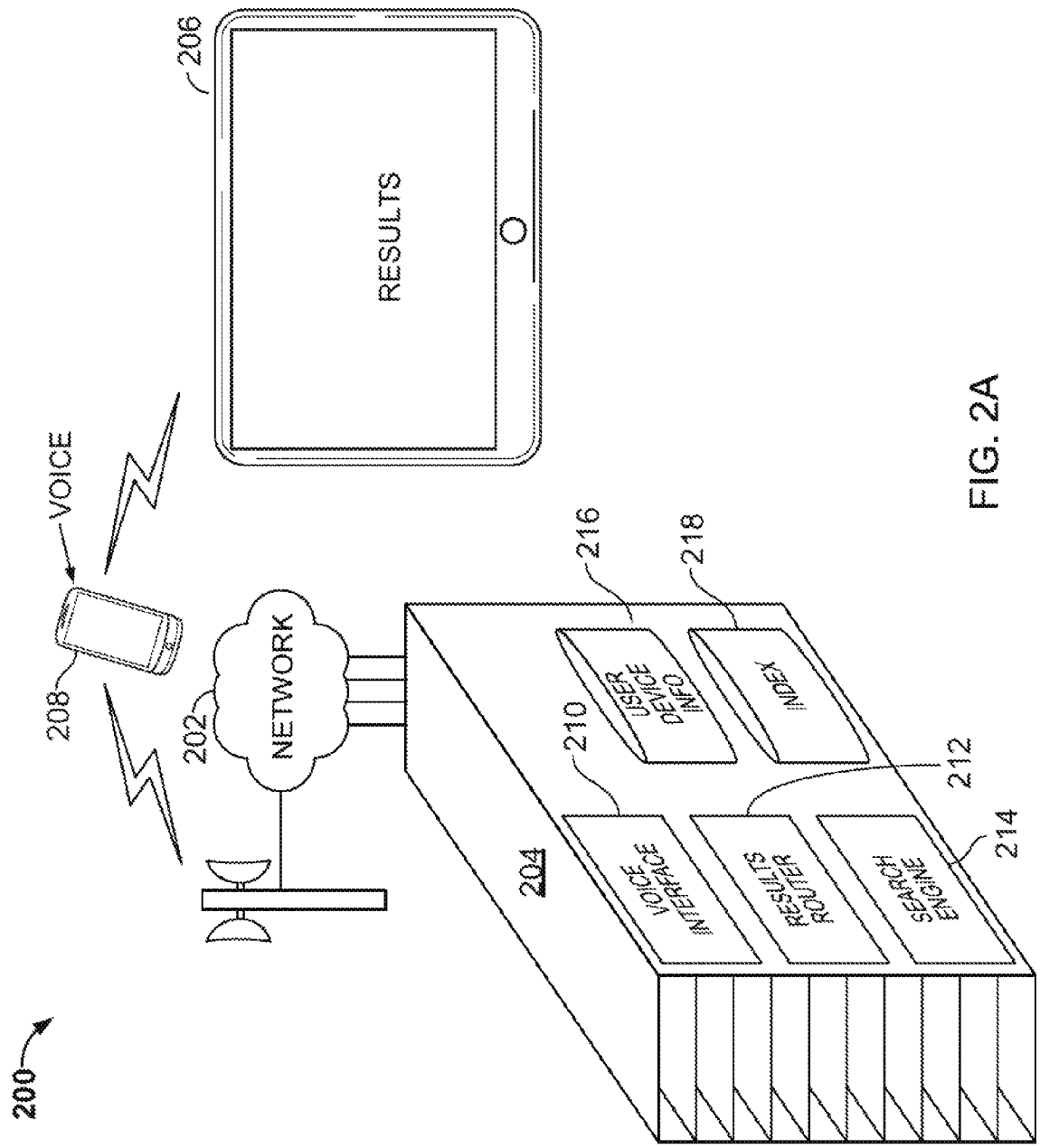
FIG. 2A is a schematic diagram of a system for sharing information between computers.

FIG. 2A is a schematic diagram of a system 200 for sharing information between computers. In general, the system 200 is established to allow a user who owns multiple computer devices, to share certain data between devices, including by passing one form of data to the central server system, and having the central server system obtain other data in response to the submissions and provide that other data to a separate target computer that is associated with the user, which association may be identified by determining that the two devices are logged into the same user account. The selection of which device to send the data to may be made automatically, such as using data stored in the user's device or by a determination made by the central server system, so that the user need not identify the target of the information when the user asks for the information to be sent.

As shown in the figure, two consumer devices in the form of smartphone 208 and a television 206 are shown and may be owned by a single individual or family. In this example, we will assume that both devices have been logged into a central server system 204 and that communication sessions have been established for both such devices 208, 206, and/or that the two devices have been paired with each other, such as in the manner discussed below in relation to FIG. 4C. Thus, at the time shown here, submissions could be made separately to the central server system 204 by either of the devices 208, 206, and normal interaction, such as web surfing and other similar interaction that is well known, may be performed in appropriate circumstances with either of the devices. In this example, the various server-side functionality is shown as residing in a single server for ease of explanation, but multiple servers and server systems may be employed.

In this particular example, an arrow and the label "voice" is shown entering the smartphone 208 to indicate that a user is speaking voice commands into the smartphone 208. The smartphone 208 may be programmed to recognize certain words that are stated into its microphone, as being words to trigger a search query that involves passing sound data up to the central server system 204 through the network 202, such as the internet. Alternatively, a user may press an on-screen icon on the smartphone 208 in order to change it from a mode for typed input into a mode for spoken input. The spoken input may be converted and/or translated according to a operating system-based service provide don the smartphone 208 and made available to subscribing applications that execute on the smartphone 208.

In this example, the voice entry is a search query, and the central server system 204 is provided with a number of components to assist in providing search results in response to the search query. For clarity, a certain number of components are shown here, though in actual implementation, a central server system may involve a large number of servers and a large number of other components and services beyond those shown here.

As one example, a voice interface 210 may be provided, and a web server that is part of a central server system 204 may route to the voice interface 210 data received in the form of voice search queries. The voice interface 210 may initially convert the provided voice input to a textual form and may also perform formatting and conversion on such text. In addition, the interface 210 or another component may perform language translation on the submitted input in appropriate circumstances, and make a determination of the target language based on information in the form of meta data that has been passed with the digitized spoken audio file. In one example, the search system may be implemented so that a user wanting to submit a voice query is required to use a trigger word before the query, either to start the device listening for the query, or to define a context for the query (e.g., "television"). The voice interface 210 may be programmed to extract the trigger word from the text after the speech-to-text conversion occurs, because the trigger word is not truly part of the user's intended query.

A search engine 204 may receive processed text from the voice interface 210, and may further process the text, such as by adding search terms for synonyms or other information in ways that are readily familiar. The search engine 204 may access information in a search index 218 to provide one or more search results in response to any submitted search query. In certain instances, the context of the search may also be taken into account to limit the types of search results that are provided to the user. For example, voice search may generate particular types of search results more often than other search results, such as local search results that indicate information in a geographical area around the user. Also, certain search terms such as the titles of television shows may indicate to the search engine 214 that the user is presenting a certain type of search, i.e., a media-related search. As a result, the search engine 214 may format the search results in a particular form, such as in the form of an electronic program guide grid for television shows. Such results may also be provided with additional information or meta data, such that a user could select a cell in a program guide so as to provide a message to a personal video recorder to set a recording of that episode.

The search engine 214 may also obtain a query from an external source, such as the television 206. For example, the voice interface 210 may convert spoken input into text and return the text to the smartphone 208, which may forward the text to television 206, which may in turn submit the text as a query to the search engine 214. The responses to queries made by the search engine 214 may be based on information that is stored in a search index 218, which may contain a variety of types of information, but may have media-related information set out from the other information so that media-directed search results may be returned by the system.

A results router 212 is responsible for receiving search results from the search engine 214 and providing them to an appropriate target device. In normal operation of a search engine, the target device is the device from which the search query was submitted. In this example, though, the target device may be a different device, and the results may be provided to it either directly from the central server system 204, or may be provided to the smartphone 208 and then forwarded to the target device, which in this situation may be the television 206. Alternatively, in the example where the text is submitted to the search engine by the television 206, the television may receive the results from the search engine 214, and then may pass all or some of the results to the smartphone 208.

The results router 212 may refer to data in a user device information database 216 to identify the addresses of devices that are associated with an account for the user who is logged in with the particular devices. In this manner, the search system 204 may determine how to properly route results to each of the devices—the the system 204 may simply respond to requests in a normal manner, and not need to correlate two different devices as being related to each other in any manner. Thus, for example, if the user provides a television or media-related request by voice, and the system 204 determines from GPS data provided with the request that the user is at home, it may determine to send the results directly to television 206, rather than back to smartphone 208. Also, the system 204 may generate results in a manner that is formatted to best work with television 206, but deliver those results to device 208 in a manner so the device 208 automatically forwards the results for display on television 206. In addition, where a user has multiple televisions, the system 204 may determine which of those televisions is currently logged on and operating, and may determine to send the search results to that particular television.

Figure 2B:
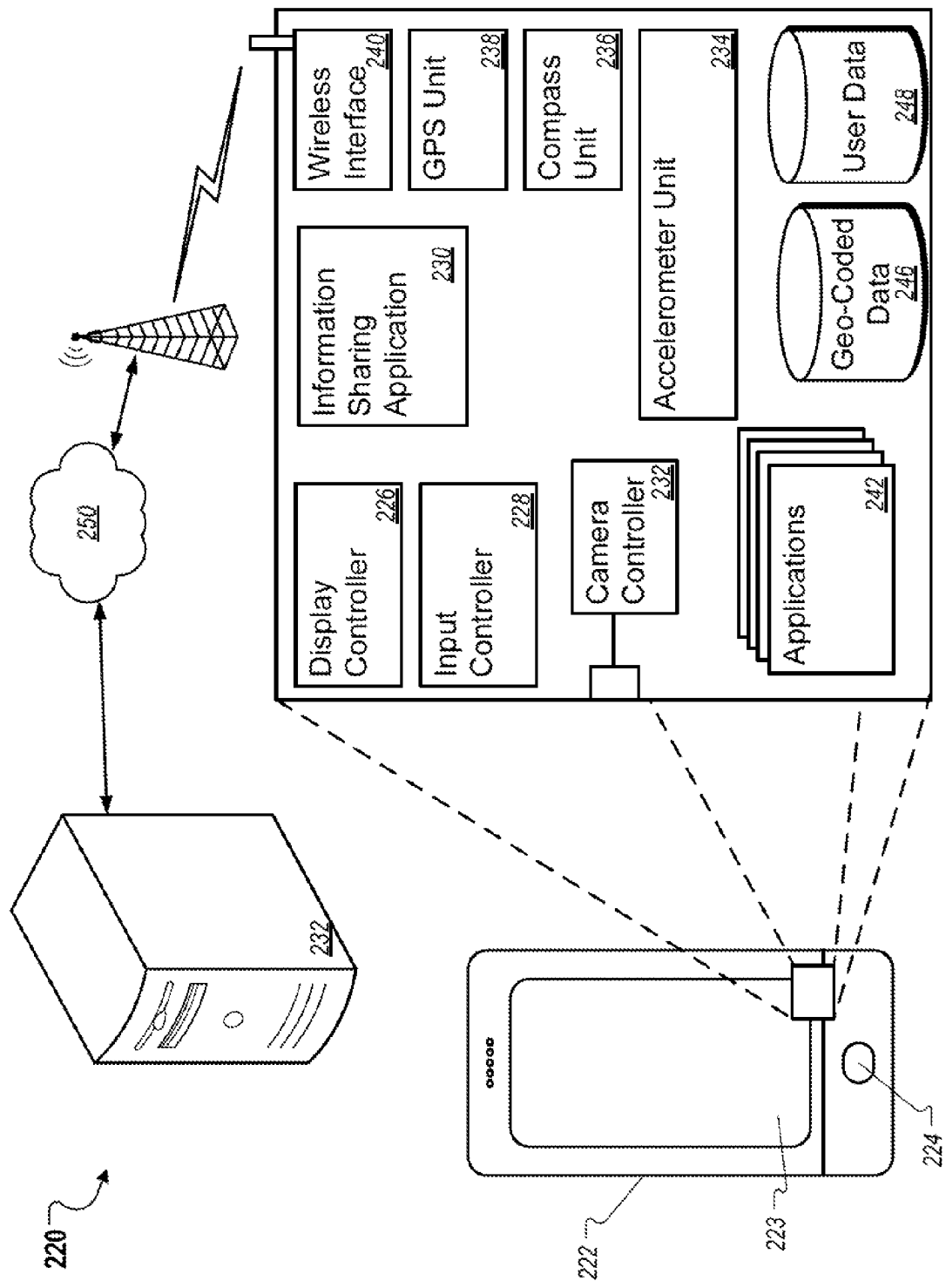
FIG. 2B is a block diagram of a mobile computing device and system for sharing information between computers.

FIG. 2B is a block diagram of a mobile device 222 and system 220 for sharing information between computers. In general, the system 220 is similar to the system 200 in FIG. 2A, but in this instance, additional details about the mobile device 222, which acts as a client here, is provided.

In the example shown, the mobile device 222 is a cellular telephone. In other implementations, the mobile device 222 can be a personal digital assistant, a laptop computer, a net book, a camera, a wrist watch, or another type of mobile electronic device. The mobile device 222 includes a camera (not shown) with camera controller 232, and a display screen 223 for displaying text, images, and graphics to a user, including images captured by the camera. In some implementations, the display screen 223 is a touch screen for receiving user input. For example, a user contacts the display screen 223 using a finger or stylus in order to select items displayed by the display screen 223, to enter text, or to control functions of the mobile device 222. The mobile device 222 further includes one or more input keys such as a track ball 224 for receiving user input. For example, the track ball 224 can be used to make selections, return to a home screen, or control functions of the mobile device 222. As another example, the one or more input keys can include a click wheel for scrolling through menus and text.

The mobile device 222 includes a number of modules for controlling functions of the mobile device 222, including modules to control the receipt of information and for triggering the providing of corresponding information to other devices (which other devices may, in turn, also include the structural components described here for device 222). The modules can be implemented using hardware, software, or a combination of the two.

For example, the mobile device 222 includes a display controller 226, which may be responsible for rendering content for presentation on the display screen 203. The display controller 226 may receive graphic-related content from a number of sources and may determine how the content is to be provided to a user. For example, a number of different windows for various applications 242 on the mobile device 222 may need to be displayed, and the display controller 226 may determine which to display, which to hide, and what to display or hide when there is overlap between various graphical objects. The display controller 226 can include various components to provide particular functionality for interacting with displayed components, which may be shared across multiple applications, and may be supplied, for example, by an operating system of the mobile device 222.

An input controller 228 may be responsible for translating commands provided by a user of mobile device 222. For example, such commands may come from a keyboard, from touch screen functionality of the display screen 223, from trackball 224, or from other such sources, including dedicated buttons or soft buttons (e.g., buttons whose functions may change over time, and whose functions may be displayed on areas of the display screen 223 that are adjacent to the particular buttons). The input controller 228 may determine, for example, in what area of the display commands are being received, and thus in what application being shown on the display the commands are intended for. In addition, it may interpret input motions on the touch screen 223 into a common format and pass those interpreted motions (e.g., short press, long press, flicks, and straight-line drags) to the appropriate application. The input controller 228 may also report such inputs to an event manager (not shown) that in turn reports them to the appropriate modules or applications. For example, a user viewing an options menu displayed on the display screen 203 selects one of the options using one of the track ball 224 or touch screen functionality of the mobile device 222. The input controller 228 receives the input and causes the mobile device 222 to perform functions based on the input.

A variety of applications 242 may operate, generally on a common microprocessor, on the mobile device 222. The applications 242 may take a variety of forms, such as mapping applications, e-mail and other messaging applications, image viewing and editing applications, video capture and editing applications, web browser applications, music and video players, and various applications running within a web browser or running extensions of a web browser. In certain instances, one of the applications, an information sharing application 230 (e.g., a television remote control application), may be programmed to communicate information to server system 232 via network 250, along with meta data indicating the user of device 222 wants to have corresponding information provided to a different device that is registered with the system 220 to the user. Communications may also be made directly to another device near device 222, without passing through the internet and a separate server system.

A wireless interface 240 manages communication with a wireless network, which may be a data network that also carries voice communications. The wireless interface 240 may operate in a familiar manner, such as according to the examples discussed below, and may provide for communication by the mobile device 222 with messaging services such as text messaging, e-mail, and telephone voice mail messaging. In addition, the wireless interface 240 may support downloads and uploads of content and computer code over a wireless network. The wireless interface 240 may also communicate over short-range networks, such as with other devices in the same room as device 222, such as when results are provided to the device 222 and need to be forwarded automatically to another device in the manners discussed above and below.

A camera controller 232 of the mobile device 222 receives image data from the camera and controls functionality of the camera. For example, the camera controller 232 can receive image data for one or more images (e.g. stationary pictures or real-time video images) from the camera and provide the image data to the display controller 226. The display controller 226 can then display the one or more images captured by the camera on the display screen 223.

Still referring to FIG. 2B, in accordance with some implementations, the information sharing application 230 uses a GPS Unit 238 of the mobile device 222 to determine the location of the mobile device 222. For example, the GPS Unit 238 receives signals from one or more global positioning satellites, and can use the signals to determine the current location of the mobile device 222. In some implementations, rather than the GPS Unit 238, the mobile device 222 includes a module that determines a location of the mobile device 222 using transmission tower triangulation (which may also be performed on a server system) or another method of location identification. In some implementations, the mobile device 222 uses location information that is determined using the GPS Unit 238 so as to identify geo-coded information that is associated with the location of the mobile device 222. In such implementations, location information obtained or determined by the GPS Unit 238 is provided to the information sharing application 230. The information sharing application 230 can use the location information to identify geo-coded data 246 stored on the mobile device 222.

The geo-coded data 246 includes information associated with particular geographic locations. For example, geo-coded data can include building names, business names and information, historical information, images, video files, and audio files associated with a particular location. As another example, geo-coded data associated with a location of a park may include hours for the park, the name of the park, information on plants located within the park, information on statues located within the park, historical information about the park, and park rules (e.g. "no dogs allowed"). The information sharing application 230 can use the current location of the mobile device 222 to identify information associated with geographic locations that are in close proximity to the location of the mobile device 222. The geo-coded data 246 can be stored on a memory of the mobile device 222, such as a hard drive, flash drive, or SD card. The mobile device 222 may also contain no pre-stored geo-coded data. The geographical information can be used in various ways, such as passing the data to the central server system 232, so that the central server system may identify a closest logged-in device to the mobile device 222, as that device may be most likely the one to which the system 220 is to send content submitted by the device 220, or a result of the content submitted by the device.

The device 222 uses a compass unit 236, or magnetometer, in some examples, e.g., to determine a current viewing direction of a camera on the device 222, within the horizontal plane of the camera. In other words, the compass unit 236 determines a direction in which a user of the mobile device 222 is looking with the mobile device 220. Viewing direction information provided by the compass unit 236 can be used to determine where information is to be shared with other devices, such as by a system determining to share information with a device in the direction of the user where the user is pointing his or her mobile device 222. In some implementations, the mobile device 222 further includes an accelerometer unit 234 which may be further used to identify a user's location, movement, or other such factors.

Still referring to FIG. 2B, in accordance with some implementations, the mobile device 222 includes user data 248. The user data 248 can include user preferences or other information associated with a user of the mobile device 222. For example, the user data 248 can include a list of contacts and a list of ID's for other devices registered to a user. Such information can be used to ensure that information is passed from one person to another.

The particular mobile device 222 shown here is generally directed to a smartphone such as smartphone 104 in FIG. 1 above and smartphone 206 in FIG. 2A above. Some or all of the features described here may also be provided with a television, including structures to enable the television to receive communications from the smartphone, and to submit queries and other communications over the internet, such as to search media-related databases for purposes of responding to user requests entered on a smartphone, but displayed on the television.

Figure 3A:
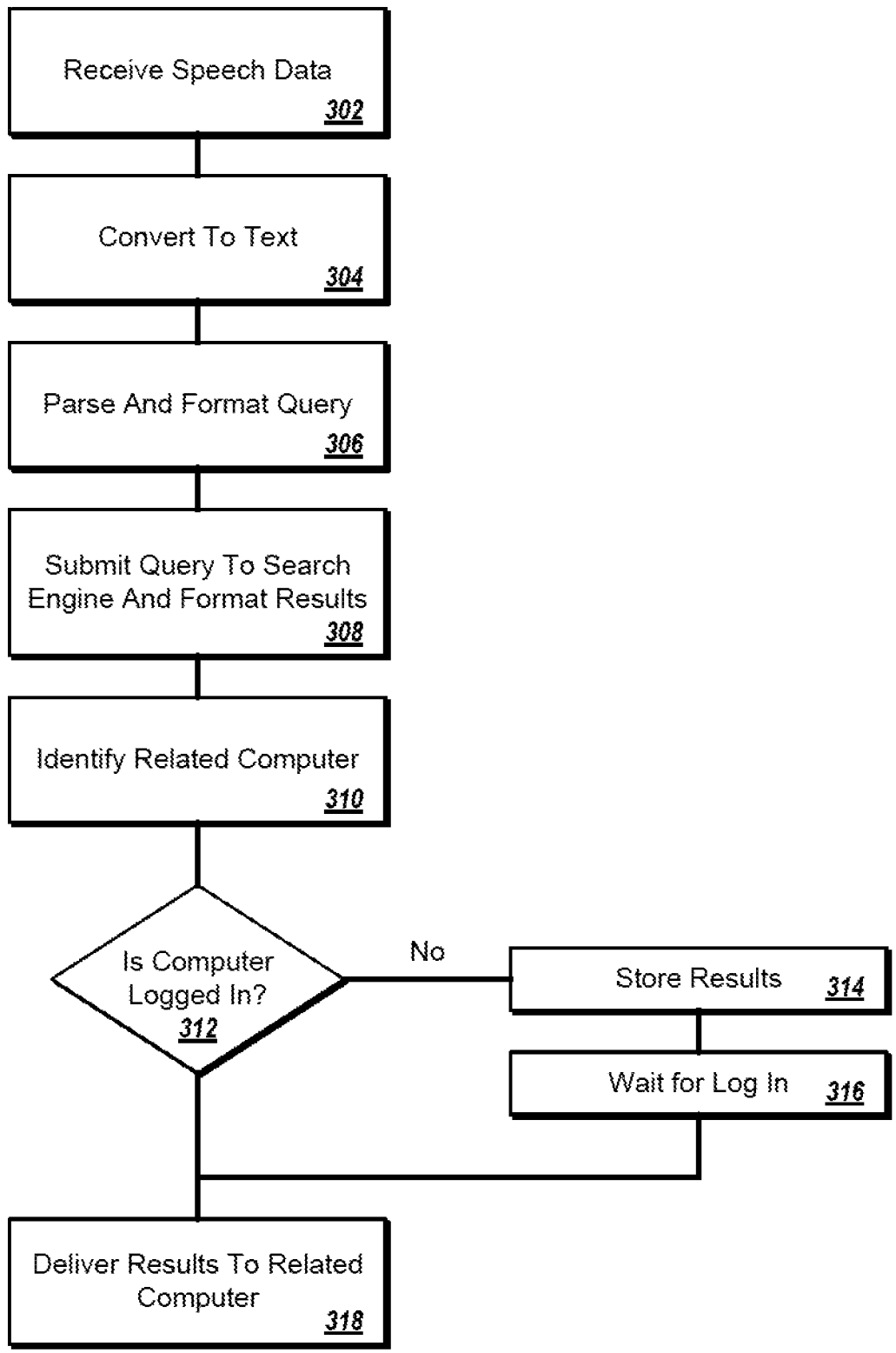
FIG. 3A is a flow chart that shows a process for receiving a request from a first computer in supplying information that is responsive to the request to a second computer.

FIG. 3A is a flow chart that shows a process for receiving a request from a first computer and supplying, to a second computer, information that is responsive to the request. In general, the process involves handling requests from one computing device, generating information responsive to those requests, and providing that generated information to a second computing device that is related to the first computing device via a particular user who has been assigned to both devices (e.g., by the fact of both devices being logged into the same user account when the process occurs).

The process begins at box 302, where speech data is received by the process. For example, a search engine that is available to the public may receive various search queries that users of mobile telephones provide in spoken form. The system may recognize such submissions as being spoken queries in appropriate circumstances and may route them for proper processing. The speech data may in one example be sent with information identifying the device on which the data was received and a location of the device, in familiar manners. Such information may subsequently be used to identify an account for a user of the device, and to determine other devices that are registered to the user in the geographic location of the submitting device.

Thus, at box 304, the speech is converted to text form. Such conversion may occur by normal mechanisms, though particular techniques may be used to improve the accuracy of the conversion without requiring users of the system to train the system for their particular voices. For example, a field of a form in which the cursor for the user was placed when they entered the query may include a label that describes the sort of information that is provided in the field, and such label information may be provided to a speech-to-text conversion system so as to improve the results of the conversion. As one example, if a user is entering text into a field of a television-related widget or gadget, the term "television" may be passed to the conversion system, and as a result, a speech model may be selected or modified so as to address television-related terms better, such as by elevating the importance of television titles and television character names in a speech model. Along with the speech-to-text conversion, in appropriate circumstances, language translation may also be performed on a submission, and text or audio may be returned in the target language, of the submission.

At box 306, the query is parsed and formatted. For example, certain control terms may be removed from the query (e.g., terms that precede the main body of the query and are determined not to be what the user is searching for, but are instead intended to control how the query is carried out), synonyms may be added to the query, and other changes may be made to the query to make a better candidate as a search query.

At box 308, the query is submitted to a search engine and results are received back from the search engine and formatted in an appropriate manner. For example, if the search results are results for various times that a television show is to be played, the results may be formatted into an HTML or similar mark-up document that provides an interactive electronic program guide showing the search results in a guide grid. A user who is reviewing the guide may then navigate up and down through channels in the guide, and back and forth during times in the guide, in order to see other shows being broadcast around the same time, and on different channels, as the identified television program search result.

At box 310, the process identifies a related computer, meaning a computer that is related to the computer that submitted the query. Such a determination may be made, for example, by consulting profile information about a user who submitted the query, to identify all of the computing devices that the user has currently or previously registered with the system, and/or that are currently logged into the system. Thus, at box 312, the process determines whether a particular one of the computers that are associated with the user are currently logged in. If no such computer is currently logged in or no such computer that is appropriate to receive the content (e.g., because it is a type of computer that can display the content or is a computer geographically near the device that submitted the query), the process may store the results 314 that were to be sent to the other computer. Thus, for example, a user may make search queries while they are not able to view results at home, but such results may be presented to them at home as soon as they log back into their account with their home system (Box 316). Alternatively, when the user logs in at another device, the system may notify them of pending deliveries from the previously-submitted queries, and they may be allowed to obtain delivery of the information from the queries when they would like.

At box 318, results are delivered to the related computer that was selected in box 310. Such delivery may occur in a variety of forms, including by simply providing a common search results list or grouping to such related computer. The information may ordinarily be delivered via HTML or similar mark-up document that may also call JavaScript or similar executable computer code. In this manner, for instance, a user of a smartphone may speak a command into the smartphone, have the command converted and/or translated, and provided to a second computer for processing by that second computer.

Figure 3B:
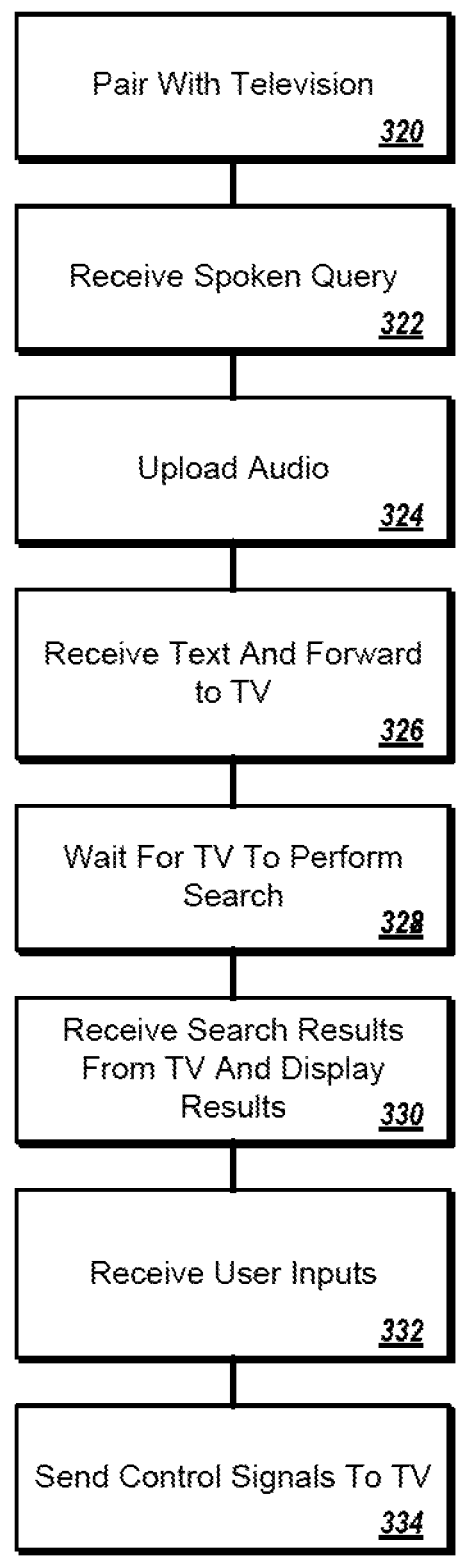
FIG. 3B is a flow chart that shows a process for processing speech input to a television remote control to affect a display on an associated television.

FIG. 3B is a flow chart that shows a process for processing speech input to a television remote control to affect a display on an associated television. In general, the process is similar to that for FIG. 3A, but the process is centered here on a mobile device that receives voice input, submits it to a server system for resolution, and then passes the resolved text to a television system for further processing, such as for submission to a search engine and display of the search results on the television. As an alternative implementation, the spoken input to the smartphone may be converted to text and/or translated in order to be submitted to a communication application that is executing on the television, such as a chat application, so that a user can sit on his couch and provide spoken input to a textual chat application that is running on his television.

The process in this example begins at box 320, where the smartphone is paired with a television. Such pairing may involve the two devices recognizing that they are able to access a network such as a WiFi LAN, and exchanging messages so as to recognize each other's existence, in order to facilitate future communication between the devices. A particular pairing example is discussed in more detail below with respect to FIG. 4C.

At box 322, the smartphone receives a spoken query form its user. To receive such input, the smartphone may be equipped with a microphone in a familiar manner, and may be loaded with an application that assists in converting spoken input into text or into another language. Such an application may be independent of any particular other application on the device, and may act as a universal converter or translator for any application that is currently operating on the device and has followed an API for receiving converted or translated information from the application.

The application captures the spoken input and places it into a digital audio file that is immediately uploaded, at box 324, to a server system for conversion and/or translation. The conversion/translation may also occur on the device if it has sufficient resources to perform an accurate conversion/translation. At box 326, the smartphone receives, in response to uploading the audio, text that has been created by the server system, and forwards the text to the television with which it is paired. Alternatively, the server system may return another audio file that represents the spoken input but in a different language. The smartphone may then wait while the television processes the transmitted text (box 328). In one example, if the user spoke a search query into the smartphone, text of the query may be transmitted to the television and the television may perform a local or server-based search using the text. The text may relate, for example, to a program, episodes of a program, actors, or songs—i.e., if a user wants to watch some television, music, or movie programming, and is trying to find something he or she will like. As one example, the user may seek to be presented with a list of all movies or television programs in which George Clooney has appeared, simply by speaking "George Clooney." The television may limits its search to media properties, and exclude searches of news relating to George Clooney, by determining the context of the query—i.e., that the user is watching television and spoke the command into a television remote control application.

The user may then review the results that may be presented on the television. At box 330, certain search results are also returned to the smartphone, either from the television or from the smartphone communicating with another remote server system. The results may be a sub-set of the results displayed on the television, or may be data for generating controls that permit the user to interact with results that are displayed on the television. For example, if ten results are returned for the most popular George Clooney projects, the television may display detail about each result along with graphical information for each. In turn, the smartphone may display basic textual labels and perhaps small thumbnail images for each of the results. A one-to-one correspondence between results displayed on the smartphone and results displayed on the television may be used to allow the user to look at the television but press on a corresponding result on the smartphone in order to select it (e.g., to have it played or recorded).

Thus, as noted, the user may interact with the search results, and may provide inputs to the smartphone (box 332), which inputs may be transmitted to the television (box 334), and reflected on the display there. For example, the user may select one of the search results, and the television may change channels to that result, be set to record the result, or begin streaming the result if it is available for streaming.

Thus, using this process, a user may take advantage of his or her smartphone's ability to convert spoken input to another language or to textual input. Such converted or translated input may then be automatically passed to the user's television and employed there is various useful manners. Such functionality may not have been available on the television, and the smartphone may not have provided access to the same experiences as did the smartphone. As a result, the user may obtain an experience—using devices the user already owns for use for other purposes—that greatly exceeds the experience from using the devices separately.

Figure 4A:
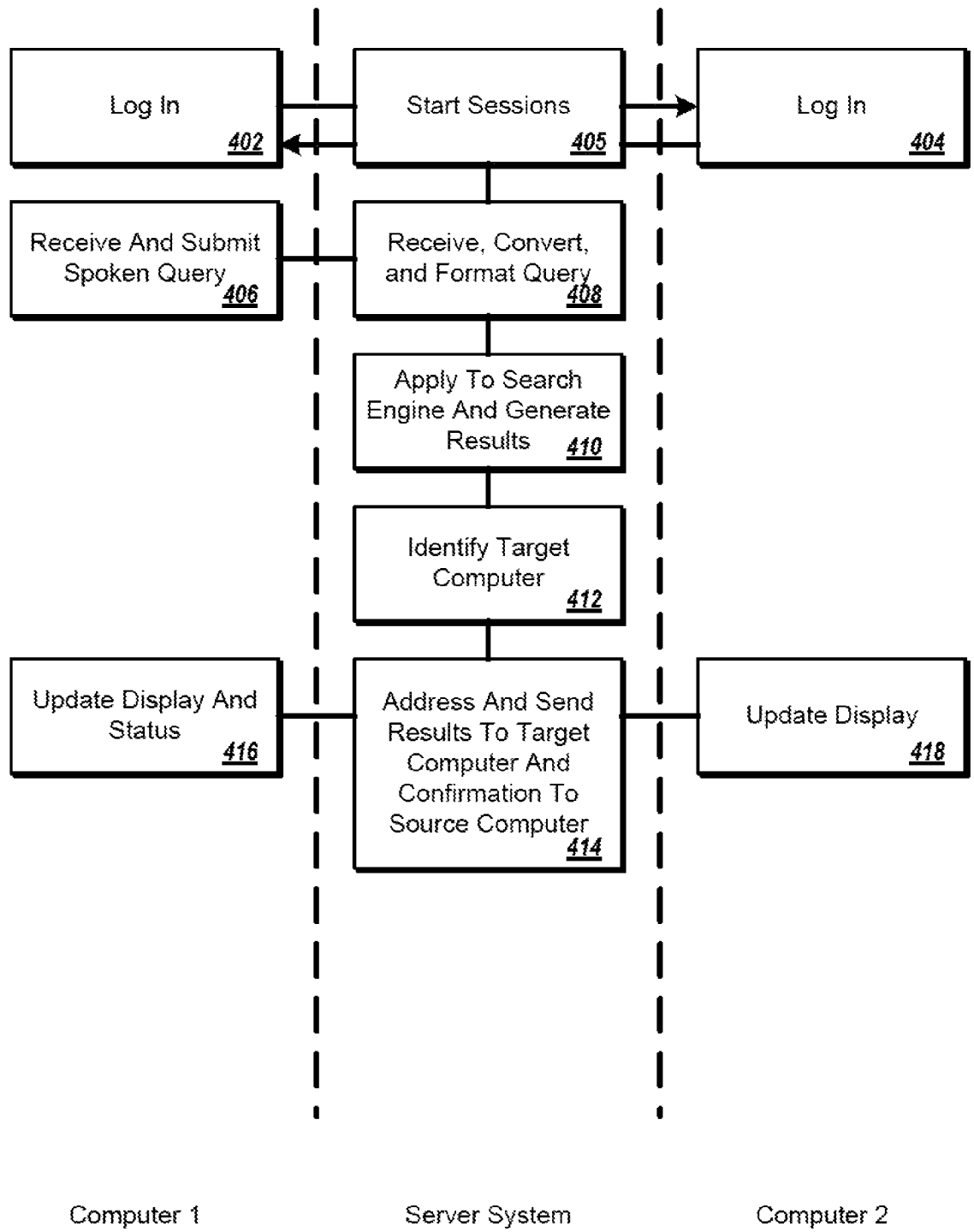
FIGS. 4A-4B are swim lane diagrams for coordinating information submission and information provision between various computers and a central server system.
Figure 4B:
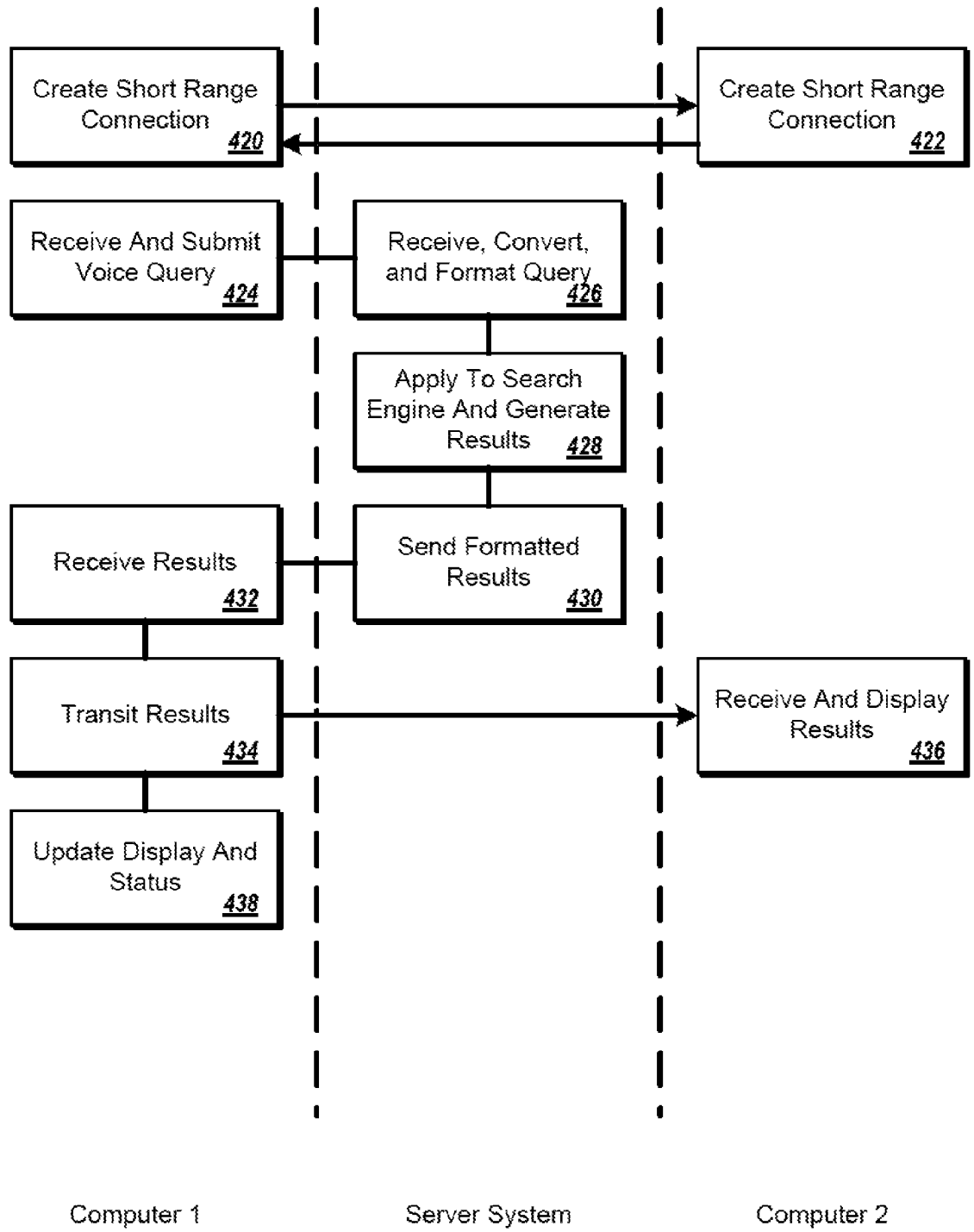

FIGS. 4A and 4B are swim lane diagrams for coordinating information submission and information provision between various computers and a central server system. In general, these figures show processes similar to that shown in FIG. 3A, but with particular emphasis showing examples by which certain operations may be performed by particular components in a system.

Referring now to FIG. 4A, the process begins at boxes 402, 404, and 405, where two different computers log in to a central server system and the server system starts sessions for those computers. Although shown as simultaneous processes for clarity here, the two systems may typically log into a central server system at different times. However, sessions may be kept open for those computers so that communication may continue in a typical manner with the computers. For example, one evening, a user may log into a service from a set-top box or from hardware integrated into a television, while watching prime time sports. The user may use such a media-watching device to search for information, including web and media-related information, and to have media programs streamed to his or her television. The next morning, the user may log into the same account on his or her desktop computer at work, and may have previously logged into the account on his or her smartphone. By such logging in, each of the devices may be related or correlated to the account, and by extension, to each other. Separately, the devices may have paired with each other if they were within range for direct communication or on the same LAN together.

At box 406, the first computer receives a query in a spoken manner from its user and submits that query to the server system. Such submission may involve packaging the spoken text into a sound file and submitting the sound file to the server system. The submission may occur by the user pressing a microphone button on a smart phone and turning on a recording capability for the smart phone that then automatically passes to the server system whatever sound was recorded by the user. The device may also crop the recording so that only spoken input, and not background noise, is passed to the server system.

At box 408, the server system receives, converts, and formats the query. The converting involves converting from a sound format to a textual speech format using various speech-to-text techniques. The converting may also, or alternatively, involve translation from the language in which the query was spoken and into a target language. The formatting may involve preparing the query in a manner that maximizes the chances of obtaining relevant results to the query, where such formatting may be needed to address an API for the particular search engine. At box 410, the appropriate formatted query is applied to a search engine to generate search results, and the search results are returned back from the search engine. In other examples described above and below, the conversion may occur during a first communication by the smartphone with a server system, and execution by the search engine may occur via a subsequent communication from another computer such as a television, after the smartphone passes the input to the other computer.

At box 412, a target computer for the search query is identified, and may be any of a number of computers that have been associated with an account for which the computing device that has submitted the query was associated. If there are multiple such computers available, various rules may be used to select the most appropriate device to receive the information, such as by identifying the geographic locations of the computer from which the query was received and the geographic locations of the other devices, and sending the results to the device that is closest to the originating device. Such associating another device with the results may occur at the time the results are generated or may occur at a later time. For example, the results may be generated and stored, and then the target device can be determined only after a user logs into the account from the determined target computer.

At box 414, the search results are addressed and formatted, and they are sent to the target computer. Such sending of the results has been discussed above and may occur in a variety of manners. At box 418, the target computer, in this example computer 2, updates its display and status to show the search results and then to potentially permit follow-up interaction by a user of the target computer. Simultaneously in this example, a confirmation is sent to the source computer, or in this example computer 1. That computer updates its display and its status, such as by removing indications of the search query that was previously submitted, and switching into a different mode that is relevant to the submission that the user provided. For example, when a user opens a search box on their device and then chooses voice input, the user may search for the title of a television program, and data for generating an electronic program guide may be supplied to the user's television. At the same time, the user's smart phone may be made automatically to convert to a remote control device for navigating the program guide, so that the user may perform follow-up actions on their search results. In other examples, a tablet computer may be the target computer, and a user may interact with search results on the tablet computer, including by selecting content on the tablet computer and sweeping it with a finger input to cause it to be copied to the source computer, such as by being added to a clipboard corresponding to the source computer.

Referring now to FIG. 4B, the process is similar to the process in FIG. 4A, but the results are routed through the first computer before ending up at the second computer. Thus, at boxes 420 and 422, a short-range connection is created between the first and second computer. For example, both of the computers may be provided with WiFi technology or BLUETOOTH technology, and may perform a handshake, or pairing process, to establish a connection between them. At box 424, the first computer receives a voice query from its user and submits that voice query to a server system. Such submissions have been described above. At box 426, the server system receives, converts, and formats the query. Again, such operations have been described in detail above. At box 428, the server system applies the query to a search engine, which generates results that are passed back to the server system from the search engine. At box 430, the formatted results are sent by the server system to the first computer which then receives those results at box 432. Again, in an alternative implementation, the submission of the query to the search engine may be by a second computer after the first computer causes the spoken input to be converted to text and passes the text to the second computer.

The first computer then transmits the results at box 434 over the previously-created short range data connection to the second computer. The second computer then receives those results and displays the results. Such a forwarding of the results from the first computer to the second computer may be automatic and transparent to the user so that the user does not even know the results are passing from the first computer to the second computer, but instead simply sees that the results are appearing on the second computer. An information handling application on the first computer may be programmed to identify related devices that are known to belong to the same user as the initiating device, so as to cause information to be displayed on those devices rather than on the initiating, or source, device.

At box 436, the display and status of the first computer is updated. Thus, for example, it may be determined that the user does not want to have a search box or voice search functionality continue to be displayed to them after they've receive search results. Rather, the display of the first computer and its status may be changed to a different mode that has been determined to be suited for interaction with whatever information has been provided to the second computer.

In this manner, results generated by a hosted server system for user interaction may be directed to a computer other than the computer on which the user interaction occurred. Such re-directed delivery of the results may provide a variety of benefits, such as allowing a user to direct information to a device that is best able to handle, display, or manipulate the results. Also, the user may be able to split duties among multiple devices, so that the user can enter queries on one device and then review results on another device (and then pass portions of the results back to the first device for further manipulation).

Figure 4C:
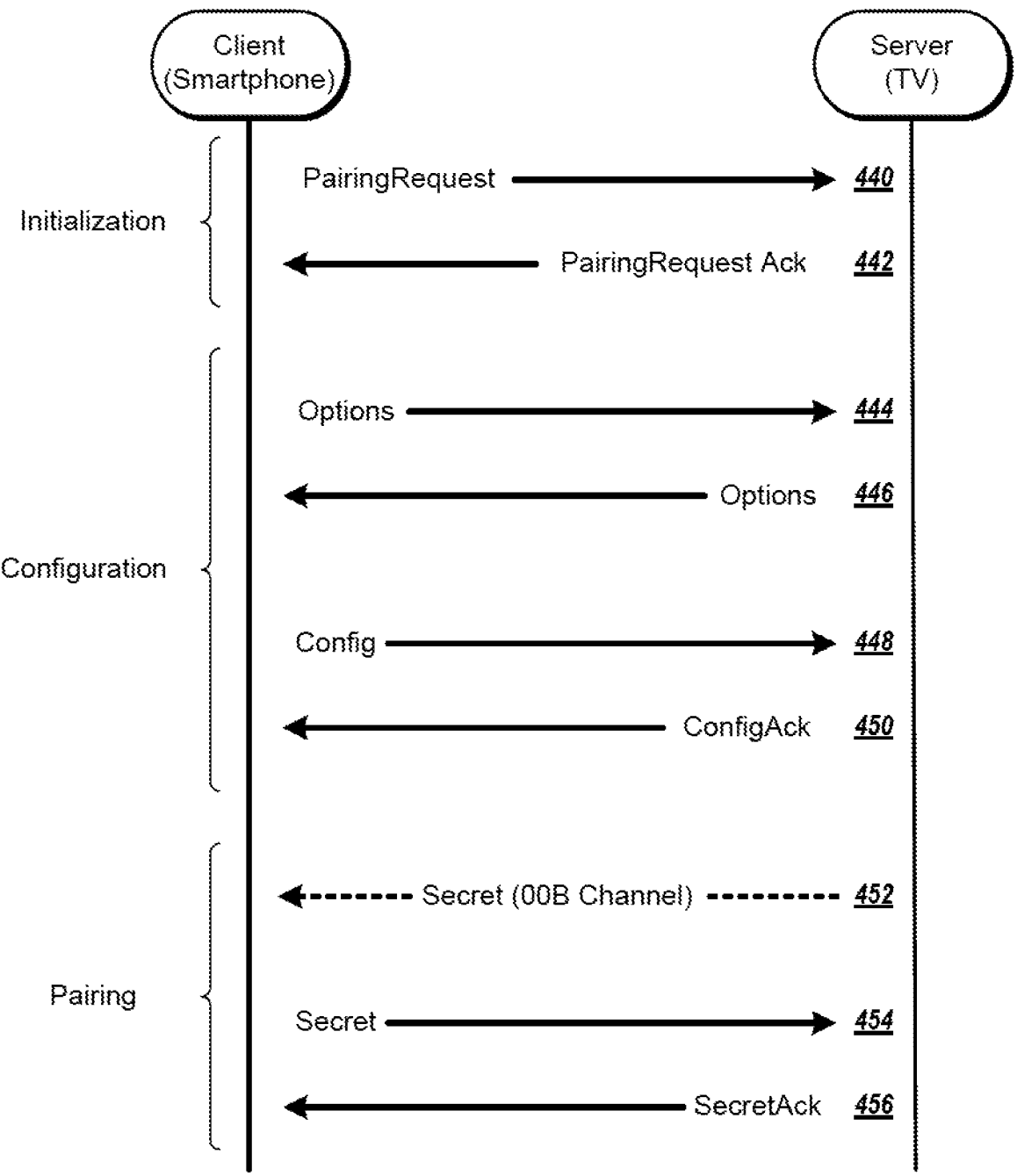
FIG. 4C is an activity diagram for pairing of two computer systems in preparation for computer-to-computer communications.

FIG. 4C is an activity diagram for pairing of two computer systems in preparation for computer-to-computer communications. The messages shown here are sent across a TCP channel established between a mobile device and a television device, where the mobile device takes the role of a client and the television device takes the role of a server. The messages, which may be variable in length, may include an unsigned integer (e.g., a 4-bit integer) that indicates the length of the message payload, followed by a serialized message.

The messaging sequence for pairing occurs in a short-lived SSL connection. A client, such as a smartphone, sends a sequence of messages to a server, such as a television, where each message calls for a specific acknowledgement form the server, and where the logic of the protocol does not branch.

The protocol in this example begins with communication 440, where the client sends a PairingRequest message to initiate the pairing process. The server then acknowledges the pairing request at communication 442. At communication 444, the client sends to the server its options for handling challenges, or identification of the types of challenges it can handle. And at communication 446, the server sends its options—the kinds of challenges it can issue and the kinds of responses inputs it can receive.

The client then sends, at communication 448, configuration details for the challenge, and the server response with an acknowledgement (communication 450). The client and server then exchange a secret (communications 452 and 454). The server may issue an appropriate challenge, such as by displaying a code. The client responds to it (e.g., via the user interacting with the client), such as by echoing the code back. When the user responds to the challenge, the client checks the response and if it is correct, sends a secret message, and the server checks the response and if it is correct, sends a secret acknowledgement (communication 456). Subsequent communications may then be made on the channel that has been established by the process, in manners like those described above and below.

Figure 4D:
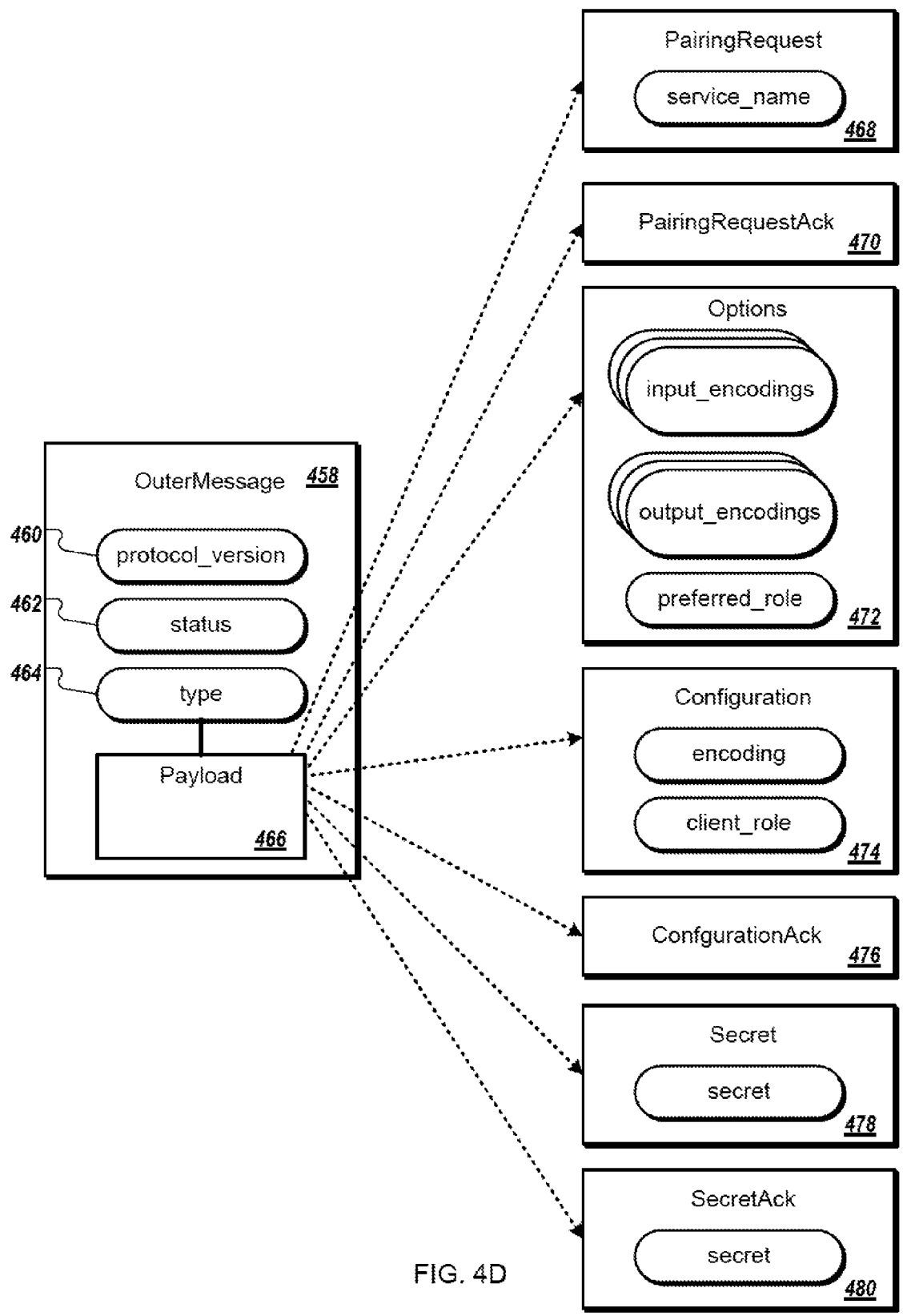
FIG. 4D is a schematic diagram showing example messages that may be used in a computer-to-computer communication protocol.

FIG. 4D is a schematic diagram showing example messages that may be used in a computer-to-computer communication protocol. Each message in the protocol includes an outer message 458, which includes fields for identifying a version of the protocol that the transmitting device is using (box 460) in the form of a integer, and a status integer that defines the status of the protocol. A status of okay implies that a previous message was accepted, and that the next message in the protocol may be sent. Any other value indicates that the sender has experienced a fault, which may cause the session to terminate. A next session may then be attempted by the devices. The outer message 458 encapsulates all messages exchanged on the wire (or in a wireless mode) and contains common header fields.

Two other fields in the outer message 458 may be made optional in some protocols, so that they are required when the status is okay, but not if it is not okay. The type field 464 contains an integer type number that describes the payload, while the payload field 466 contains the encapsulated message whose type matches the "type" field 464. Each of the remaining fields 468-480 may appear in the payload in different communications, where only one of the fields 468-480 would appear in any particular communications. As shown, the particular example fields here match respective communications in the activity diagram of FIG. 4C.

Figure 4E:
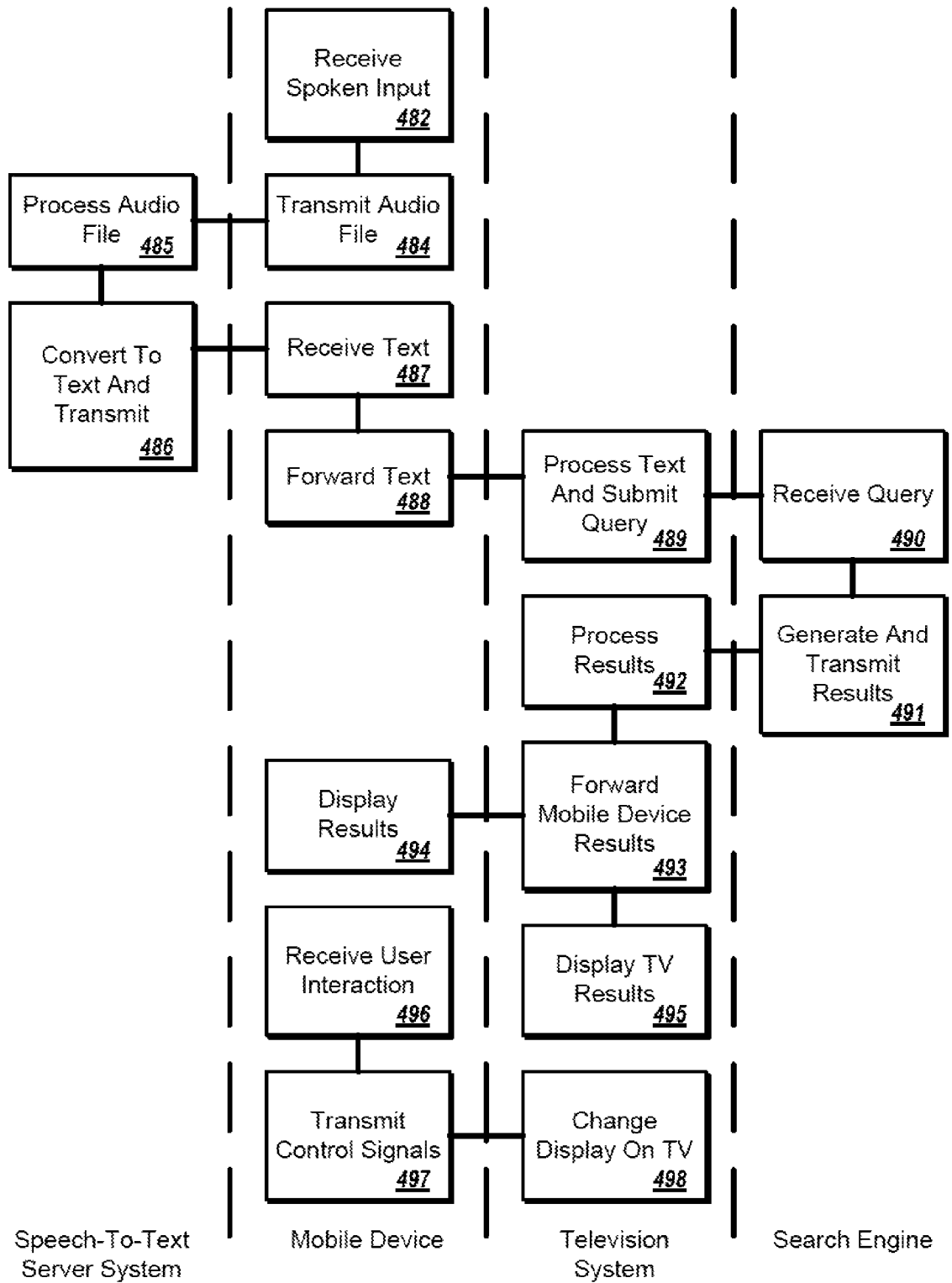
FIG. 4E is a swim lane diagram of a process for providing voice input to a television from a mobile computing device.

FIG. 4E is a swim lane diagram of a process for providing voice input to a television from a mobile computing device. In general, this process shows the approach described above (e.g., with respect to FIG. 1B) by which a mobile device like a smartphone causes a speech-to-text conversion to be performed, passes the text to another computer, such as a television, and the television then performs a search or other operation using the converted text.

The process begins at box 482, where the mobile device receives a spoken input from a user. Depending on the context, the input may be assumed to be intended as a search query, such as when the user speaks the query while a search box is being displayed on the mobile device. At box 484, the mobile device transmits to the speech-to-text server system an audio file that includes the spoken input. The server system then processes the audio file (box 485), such as by recognizing the type of input from meta data that is provided with the digital audio file. The server system then converts the spoken audio to corresponding text and transmits the text back to the mobile device (box 486).

At box 487, the mobile device receives the text that has been converted from the spoken input, and forwards the text to a television system at box 488. The text may be converted, reformatted, or transferred, into different forms by the mobile device before being forwarded. For example, the text may be provided into a transmission like that shown in FIG. 4E below so as to match an agree-upon protocol for communications between the mobile device and the television.

The television then processes the text according to an automated sequence that is triggered by receiving text in a particular type of transmission form the mobile device. At box 489, for example, the television processes the text and then places it into a query that is transmitted to a search engine. The search engine in turn receives the query (box 490), and generates and transmits search results for the query in a conventional manner (box 491). In this example, the corpus for the query may be limited to media-related items so that the search results represent instances of media for a user to watch or listen to—as contrasted to ordinary web search results, and other such results.

The television then processes the results (box 492) in various manners. In one example, where the data returned from the search engine includes search results, the television may pass information about the results to the mobile device (box 493), and the device may display a portion of that information as a list of the search results (box 494). The television may also display the search results, in the same form as on the mobile device or in a different form (box 495), which may be a "richer" form that is more attuned to a larger display, such as by providing larger images, additional text, or animations (e.g., similar to the video clips that are often looped on the main screens for DVDs).

A user of the mobile device and simultaneous viewer of the television may then interact with the results in various manners. For example, if the results are media-related search results, the user may choose to view or listen to one of the results. If the results are statements by other users in a chat session, the user may choose to respond—such as by again speaking a statement into the mobile device. At box 496, the mobile device receives such user interaction, and transmits control signals at box 497 to the television. The television may then be made to respond to the actions (box 498), such as by changing channels, setting the recording for a PVR, starting the streaming of a program, or other familiar mechanisms by which a user may interact with a television or other form of computer.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A computer-implemented method comprising:
   receiving, by a portable computing device, a spoken query from a user of the portable computing device;
   determining that the spoken query is classified as a television-related query;
   submitting, by the portable computing device to a remote server system, a digital recording of the spoken query and data indicating that the spoken query is classified as a television-related query;
   receiving, at the portable computing device from the remote server system, a transcription of the spoken query; and
   automatically transmitting the transcription of the spoken query from the portable computing device to a television system,
   wherein the television system is programmed to modify the transcription of the spoken query received from the remote server system via the portable computing device, to submit the modified transcription of the spoken query received from the remote server system via the portable computing device as a search query to a remote search engine, and to display to the user media-related results that are determined to be responsive to the search query.

2. The computer-implemented method of claim 1, further comprising, before automatically transmitting the transcription of the spoke query, pairing the portable computing device and television system over a local area network using a pairing protocol by which the portable computing device and television system communicate with each other in a predetermined manner.

3. The computer-implemented method of claim 1, further comprising using the modified transcription of the spoken query to perform a local search of files stored on recordable media located in the television system.

4. The computer-implemented method of claim 1, further comprising determining on the portable computing device whether the spoken query is directed to the television system, wherein automatically transmitting the transcription of the spoken query from the portable computing device to the television system is in response to determining that the spoken query is directed to the television system.

5. The computer-implemented method of claim 1, further comprising receiving, by the portable computing device from the television system, a subset of the media-related results that are determined to be responsive to the modified transcription, then invoking, by the portable computer device, a remote control application that provides television remote control functionality with respect to the subset of the media-related results.

6. The computer-implemented method of claim 1, wherein the media-related results are a same television program, but different episodes of the same television program at different times.

7. The computer-implemented method of claim 1, wherein the media-related results identify different broadcast times of a particular program item of media content, and wherein the particular program item of media content is the same program being broadcast on different channels at different times.

8. The computer-implemented method of claim 1, wherein the media-related results identify different broadcasts of a particular item of media content.

9. The method of claim 1, wherein determining that the spoken query is classified as a television-related query is based on identifying an inclusion of a trigger word in the spoken query, the method further comprising:
   removing the trigger word from the transcription, by the portable computing device, before automatically transmitting the transcription to the television system.

10. The method of claim 1, wherein the television-related query comprises a query directed to the television system.

11. A system, comprising:
    one or more computers and one or more storage devices storing instructions that are operable, when executed by the one or more computers, to cause the one or more computers to perform operations comprising:
    receiving, by a portable computing device, a spoken query from a user of the portable computing device, by the portable computing device;
    submitting, by the portable computing device to a remote server system, a digital recording of the spoken query and data indicating that the spoken query is classified as a television-related query;
    receiving, at the portable computing device from the remote server system, a transcription of the spoken query; and
    automatically transmitting the transcription of the spoken query from the portable computing device to a television system,
    wherein the television system is programmed to modify the transcription of the spoken query received from the remote server system via the portable computing device, to submit the modified transcription of the spoken query received from the remote server system via the portable computing device as a search query to a remote search engine, and to display to the user media-related results that are determined to be responsive to the search query.

12. The system of claim 11, further comprising operations of, before automatically transmitting the transcription of the spoke query, pairing the portable computing device and television system over a local area network using a pairing protocol by which the portable computing device and television system communicate with each other in a predetermined manner.

13. The system of claim 11, further comprising operations of using the modified transcription of the spoken query to perform a local search of files stored on recordable media located in the television system.

14. The system of claim 11, further comprising operations of determining on the portable computing device whether the spoken query is directed to the television system, wherein automatically transmitting the transcription of the spoken query from the portable computing device to the television system is in response to determining that the spoken query is directed to the television system.

15. The system of claim 11, wherein the media-related results are a same television program, but different episodes of the same television program at different times.

16. The system of claim 11, wherein the media-related results identify different broadcast times of a particular program item of media content, and wherein the particular program item of media content is the same program being broadcast on different channels at different times.

17. The system of claim 11, wherein the media-related results identify different broadcasts of a particular item of media content.

18. A non-transitory computer-readable medium storing software comprising instructions executable by one or more computers which, upon such execution, cause the one or more computers to perform operations comprising:

receiving, by a portable computing device, a spoken query from a user of the portable computing device, by the portable computing device;

submitting, by the portable computing device to a remote server system, a digital recording of the spoken query and data indicating that the spoken query is classified as a television-related query;

receiving, at the portable computing device from the remote server system, a transcription of the spoken query; and automatically transmitting the transcription of the spoken query from the portable computing device to a television system, wherein the television system is programmed to modify the transcription of the spoken query received from the remote server system via the portable computing device, to submit the modified transcription of the spoken query received from the remote server system via the portable computing device as a search query to a remote search engine, and to display to the user media-related results that are determined to be responsive to the search query.

19. The storage medium of claim 18, further comprising operations of, before automatically transmitting the transcription of the spoke query, pairing the portable computing device and television system over a local area network using a pairing protocol by which the portable computing device and television system communicate with each other in a predetermined manner.

20. The storage medium of claim 18, further comprising operations of using the modified transcription of the spoken query to perform a local search of files stored on recordable media located in the television system.

21. The storage medium of claim 18, further comprising operations of receiving, by the portable computing device from the television system, a subset of the media-related results that are determined to be responsive to the modified transcription, then invoking, by the portable computer device, a remote control application that provides television remote control functionality with respect to the subset of the media-related results.

22. The storage medium of claim 18, wherein the media-related results identify different broadcast times of a particular program item of media content, and wherein the particular program item of media content is the same program being broadcast on different channels at different times.

23. The storage medium of claim 18, wherein the media-related results are a same television program, but different episodes of the same television program at different times.

24. The storage medium of claim 18, wherein the media-related results identify different broadcasts of a particular item of media content.

* * * * *

UNITED STATES PATENT AND TRADEMARK OFFICE
CERTIFICATE OF CORRECTION

PATENT NO. : 8,522,283 B2
APPLICATION NO. : 13/111853
DATED : August 27, 2013
INVENTOR(S) : Pierre-Yves Laligand It is certified that error appears in the above-identified patent and that said Letters Patent is hereby corrected as shown below:

In the Claims:

Column 26, line 14, Claim 9, please delete "The" and insert therefor -- The computer-implemented --; and Column 26, line 21, Claim 10, please delete "The" and insert therefor
-- The computer-implemented --.

Signed and Sealed this
Twelfth Day of November, 2013

Teresa Stanek Rea
*Deputy Director of the United States Patent and Trademark Office*